(12) United States Patent
Wang

(10) Patent No.: US 8,260,130 B2
(45) Date of Patent: Sep. 4, 2012

(54) AUTO FOCUS DEVICE OF MOBILE COMMUNICATION APPARATUS

(75) Inventor: Ho-Ju Wang, Taipei (TW)

(73) Assignee: Ability Enterprise Co., Ltd., Taipei (TW)

( * ) Notice: Subject to any disclaimer, the term of this patent is extended or adjusted under 35 U.S.C. 154(b) by 112 days.

(21) Appl. No.: 12/822,986

(22) Filed: Jun. 24, 2010

(65) Prior Publication Data

US 2011/0281616 A1    Nov. 17, 2011

(30) Foreign Application Priority Data

May 14, 2010    (TW) ................................ 99115535 A

(51) Int. Cl.
| | |
|---|---|
| G03B 3/10 | (2006.01) |
| G03B 13/24 | (2006.01) |
| G03B 17/00 | (2006.01) |
| H04M 1/00 | (2006.01) |

(52) U.S. Cl. .......... 396/133; 396/79; 396/529; 348/357; 359/824; 455/556.1

(58) Field of Classification Search .................. 396/133, 396/349, 529, 79; 348/357, 340; 359/823–826; 455/556.1
See application file for complete search history.

(56) References Cited

U.S. PATENT DOCUMENTS

2008/0124068 A1*   5/2008   Kwon et al. .................. 396/127
* cited by examiner

*Primary Examiner* — Rochelle-Ann J Blackman
(74) *Attorney, Agent, or Firm* — Stout, Uxa, Buyan & Mullins, LLP

(57) ABSTRACT

An auto focus device of a mobile communication apparatus is disclosed. The auto focus device comprises a voice coil motor, a first driving circuit and a second driving circuit. The voice coil motor comprises a floating movable device and a lens in the floating movable device. The first driving circuit drives the voice coil motor so that the floating movable device moves inside the voice coil motor to zoom in/out and focus the lens on image sensors when the camera function is activated. The second driving circuit drives the voice coil motor to fix the floating movable device inside the voice coil motor and cover the image sensors.

19 Claims, 3 Drawing Sheets

(a)

(b)

(c)

AUTO FOCUS DEVICE OF MOBILE COMMUNICATION APPARATUS

CROSS-REFERENCE TO RELATED APPLICATIONS

The entire contents of Taiwan Patent Application No. 099115535, filed on May 14, 2010, from which this application claims priority, are incorporated herein by reference.

BACKGROUND OF THE INVENTION

1. Field of the Invention

The present invention generally relates to an auto focus (AF) device of a mobile communication apparatus, and more particularly to an auto focus device which can prevent image quality from being degraded due to drop test of a floating device of a voice coil motor of the auto focus device.

2. Description of Related Art

Electronic products such as mobile phones, digital cameras and digital video cameras are usually equipped with voice coil motors as driving devices. Particularly, the voice coil motor is one of the key components of a high end mobile phone with an auto focus camera. Conventional voice coil motor is constituted by a floating device, a winding coil, a magnet and a lens located inside the floating device. The auto focus function is performed through the movement of the floating device inside the voice coil motor. The floating device moves due to the interaction between the magnet and the winding coil when an electric current flows through the winding coil since the magnet surrounds the magnet.

However, some problems resulting from the floating device are presented in electronic products which use conventional voice coil motors during test and use. Since the floating device is under controlled only if an electric current flows through the winding coil, the floating device will randomly move without being controlled inside the voice coil motor when the magnet and the winding coil do not interact with each other. For example, when a high end mobile phone with an auto focus camera is under a drop test, the floating device inside the voice coil motor will irregularly vibrates and collides with the inner surface of voice coil motor to generate particles. These particles will pass through the gap between the floating device and the inner surface of voice coil motor and fall on the surface of image sensors with a large possibility during further vibration. Thus black dots or shadow regions will present on images and degrade the quality of the images.

FIGS. 1A and 1B show schematic views of a floating device of a conventional voice coil motor moving and vibrating to generate particles. FIG. 1A shows that a floating device 102 inside a voice coil motor 100 moves to perform auto focus on an image sensor 104 due to the interaction between a magnet (not shown) and a winding coil (not shown) when an electric current flows through the winding coil. FIG. 1B shows that the floating device 102 irregularly vibrates (up or down) and collides (slightly toward right or left) with the inner surface of voice coil motor without being controlled to generate particles 105 during a drop test. The particles 105 then pass through the gap between the floating device and the inner surface of voice coil motor resulting from the vibration and fall on the surface of the image sensor 104 during further vibration. Therefore, a plurality of black dots or shadow regions will present on images.

In order to solve the above-mentioned drawbacks of an auto focus device with a conventional voice coil motor, a new auto focus device is thus provided to effectively solve the problems of image quality resulting from particles generated from a floating device of the voice coil motor during a drop test to improve the yield ratio of product.

SUMMARY OF THE INVENTION

An object of the present invention is to provide an auto focus device which can prevent from particles formed from a floating device of a voice coil motor during a drop test or improper use to prevent the degradation of image quality.

According to the object, one embodiment of the present invention provides an auto focus device of a mobile communication apparatus. The auto focus device comprises a voice coil motor, a first driving circuit and a second driving circuit. The voice coil motor has a floating device and a lens in the floating device. The first driving circuit drives the voice coil motor to move the floating device inside the voice coil motor and to perform auto focus on at least one image sensor unit through the lens when a camera function of the mobile communication apparatus is in use. The second driving circuit drives the voice coil motor to fix the floating device inside the voice coil motor, contact against and cover the image sensor unit when the camera function of the mobile communication apparatus is not in use.

Another embodiment of the present invention provides a voice coil motor for an apparatus with auto focus function. The voice coil motor comprises a floating device, a winding coil winding the floating device, a magnet and a lens located in the floating device. The floating device moves inside the voice coil motor to perform auto focus on at least one image sensor unit when a forward electric current flows through the winding coil, the floating device fixes inside the voice coil motor, contacts against and cover the image sensor unit when a reverse electric current flows through the winding coil, the floating device has an outward inclined structure at one end adjacent to the image sensor unit in order to block and prevent particles generated from the collision between the floating device and the voice coil motor from falling on the surface of the image sensor unit. The magnet surrounds the winding coil and interacts with the winding coil with the forward or reverse electric currents to move the floating device and to perform auto focus.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

DETAILED DESCRIPTION OF THE INVENTION

The detailed description of the present invention will be discussed in the following embodiments in accordance with corresponding drawings which are not intended to limit the scope of the present invention, but can be adapted for other applications. Beside the detailed description, the invention can be made and performed by other replacement, modified and equivalent embodiments which are included in the scopes of the invention and the claims. In the description of the present invention, a plurality of detailed features are provided to enable one with ordinary skill in the art to make and use the invention. However, the invention can still be performed while some detailed features are omitted. Furthermore, well-known process steps or elements are not described in detail. While drawings are illustrated in details, it is appreciated that the scale of each component may not be expressly exactly.

Figure 1A:
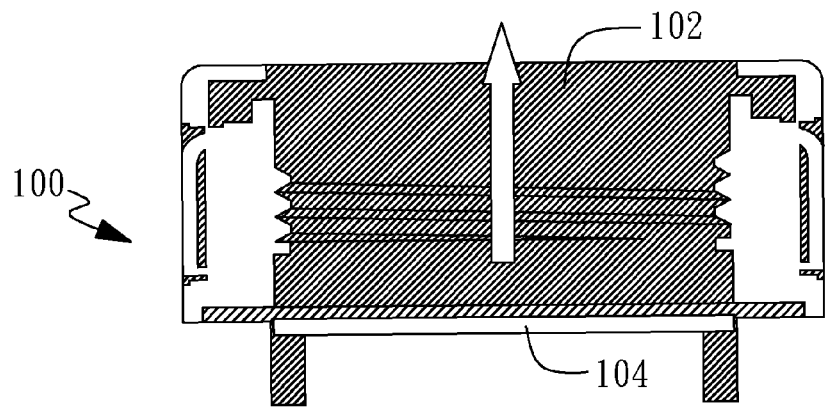
FIGS. 1A and 1B show schematic views of a floating device of a conventional voice coil motor moving and vibrating to generate particles.
Figure 1B:
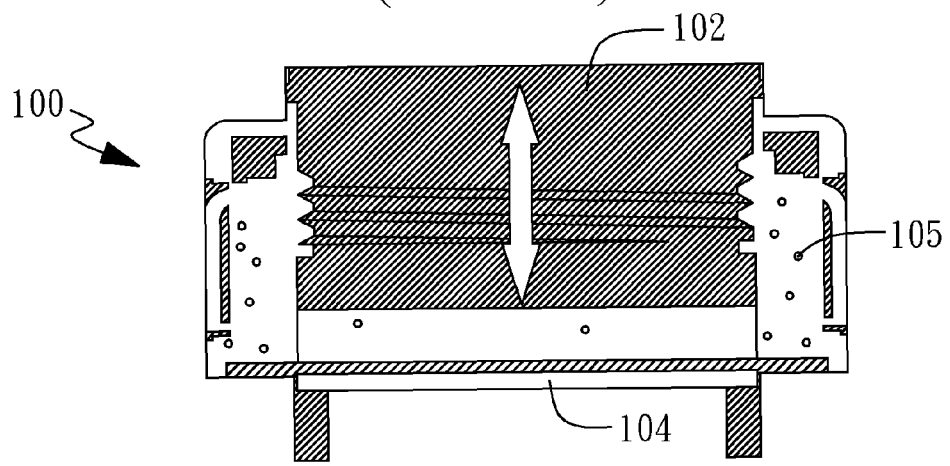
Figure 2:
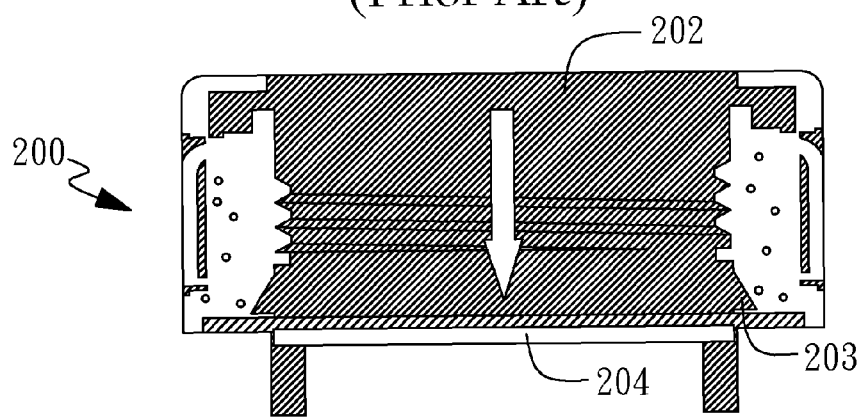
FIG. 2 shows a voice coil motor of an auto focus device of one embodiment of the invention.

Referring to FIG. 2, a voice coil motor of an auto focus device of one embodiment of the invention is shown. The voice coil motor 200 includes a floating device 202, wherein the floating device 202 has an outward inclined structure 203 at one end in order to block and prevent particles generated from the collision between the floating device 202 and the voice coil motor 200 from falling on the surface of an image sensor 204. It is noted that FIG. 2 only shows a schematic view of the voice coil motor and some well-known features are omitted. The voice coil motor 200 further includes a winding coil (not shown) surrounding the floating device 202, a magnet surrounding the winding coil and a lens located inside the floating device 202. The omitted well-known features can be practiced by any related art and anyone with ordinary skill in the art can make and use the invention based on ordinary level of skill in the art.

Figure 3:
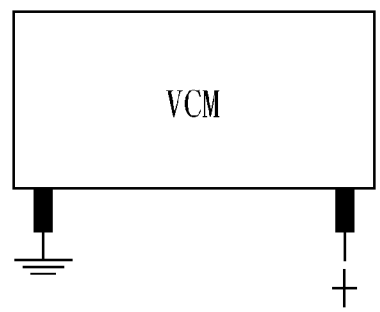
FIG. 3 shows a schematic view of operation of a voice coil motor of an auto focus device of one embodiment of the invention.
Figure 3:
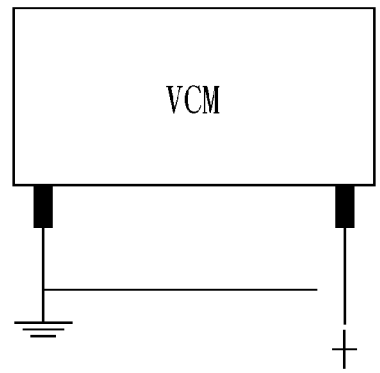
Figure 3:
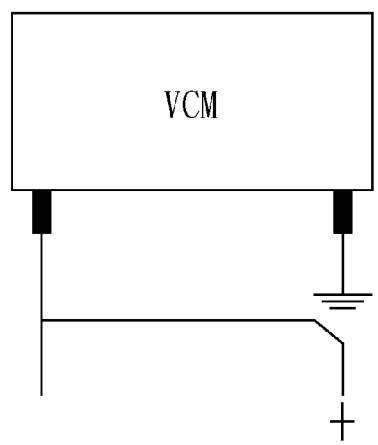

Referring to FIG. 3, a schematic view of operation of a voice coil motor of an auto focus device of one embodiment of the invention is shown. As shown in (a) and (b), when the voice coil motor is used to performed auto focus, a voltage is applied on two terminals of the winding coil surrounding the floating device so that the magnetic interacts with the winding coil with an electric current and the floating device moves inside the voice coil motor to perform auto focus function. When the auto focus function is turned off by terminating the operation of the voice coil motor, as shown in (c), a reverse voltage is applied on two terminals of the winding coil surrounding the floating device so that the magnetic interacts with the winding coil with a reverse electric current and the floating device is fixed inside the voice coil motor.

When the embodiment mentioned above is applied in a mobile phone with an auto focus camera, if the mobile phone is in use without activating the camera function (no forward voltage applied to operate the voice coil motor), a reverse voltage is applied on two terminals of the winding coil surrounding the floating device to generate a reverse current therein (a reverse force) to fix the floating device inside the voice coil motor. Thus when the mobile phone is under a drop test, the voice coil motor maintains stable to prevent the floating device irregularly vibrates and collides with the inner surface of voice coil motor to generate particles. Furthermore, the outward inclined structure of the floating device can block and prevent particles generated from the collision between the floating device and the voice coil motor from falling on the surface of an image sensor to form a plurality of black dots or shadow regions on images.

Figure 4A:
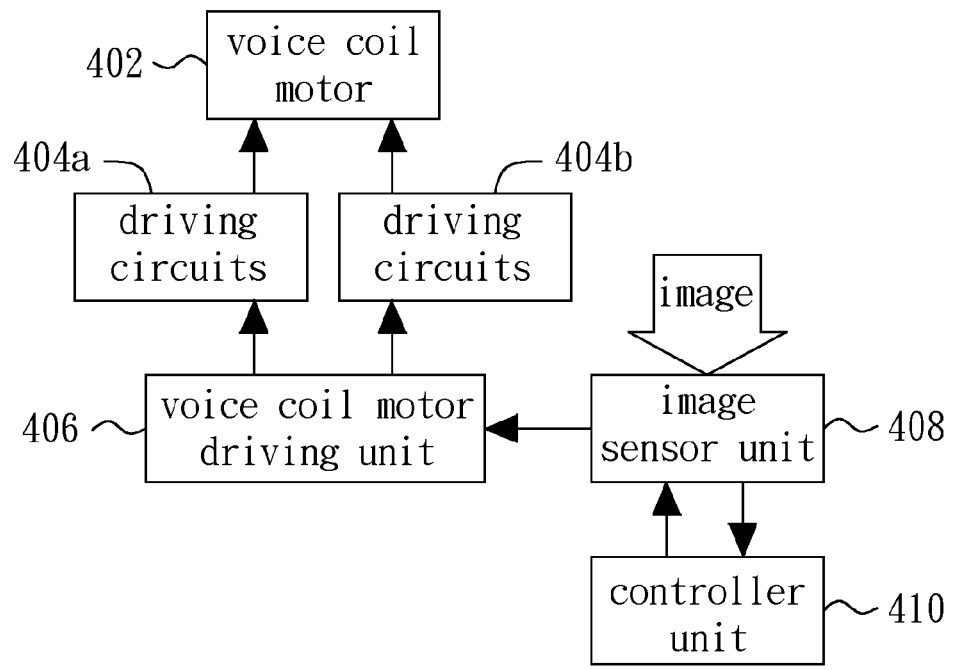
FIG. 4A shows an auto focus device of one embodiment of the invention.

FIG. 4A shows an auto focus device of one embodiment of the invention. The auto focus device comprises a voice coil motor 402, driving circuits 404a and 404b, a voice coil motor driving unit 406, an image sensor unit 408 and a controller unit 410. The image sensor unit 408 comprises a system on chip (SOC) which integrates an image signal processor (ISP) and complementary metal oxide semiconductor devices (CMOS). When the auto focus device of the embodiment mentioned above is applied in an electronic appliance comprising a mobile communication apparatus or a mobile phone with an auto focus camera, if the camera function is in use, images obtained through the lens of the voice coil motor 402 and received by the image sensor unit 408 are transformed to image signals. The image signals are transmitted to the controller unit 410 and the controller unit 410 feeds back the quality of the images to the image sensor unit 408 and the image sensor unit 408 outputs control signals to control the voice coil motor driving unit 406. The voice coil motor driving unit 406 controls the driving circuit 404a according to the control signals. The driving circuit 404a provides the winding coil with a forward voltage to drive the voice coil motor 402 and the winding coil with the electronic current interacts with the magnet to make the floating device moves inside the voice coil motor 402 so that the lens in the floating device can perform auto focus on the image sensor unit 408. The image sensor unit 408 then transforms the images received to image signals and transmits the image signals to the controller unit 410 for further image signal processing. The controller unit 410 comprises a backend integrated circuit chip (backend IC) for backend image signal processing.

When the camera function of the mobile communication apparatus or the mobile phone is not in use, the controller unit 410 transmits control signals through the image sensor unit 408 to the voice coil motor driving unit 406. The voice coil motor driving unit 406 controls the driving circuit 404b according to the control signal. The driving circuit 404b provides the winding coil with a reverse voltage to drive the voice coil motor 402 and the winding coil with the electronic current interacts with the magnet to make the floating device fixed inside the voice coil motor 402 so as to prevent the floating device from colliding with the inner surface of the voice coil motor 402 due to vibration. The floating device can be fixed against the image sensor inside the voice coil motor as shown in FIG. 2.

Figure 4B:
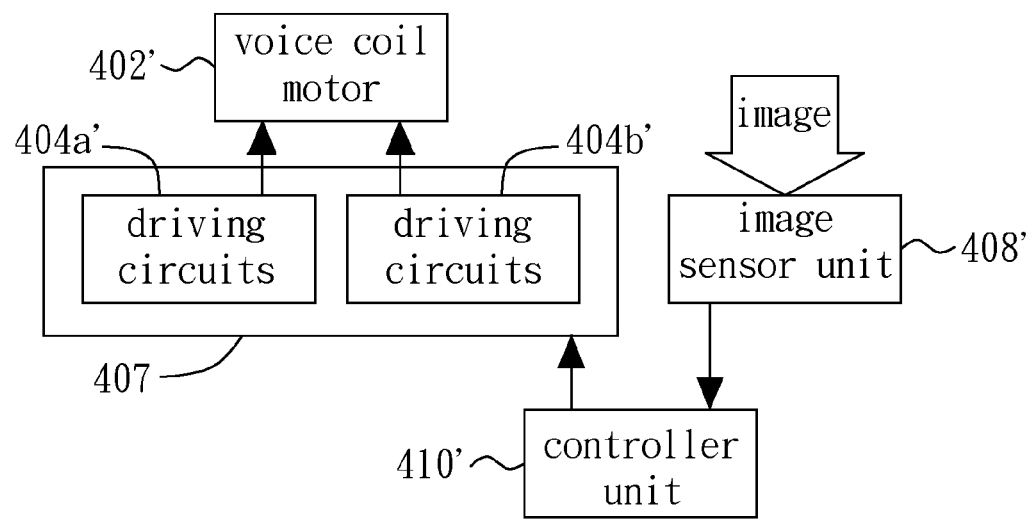
FIG. 4B shows an auto focus device of another embodiment of the invention.

FIG. 4B shows an auto focus device of another embodiment of the invention. The auto focus device comprises a voice coil motor 402', driving circuits 404a' and 404b', a voice coil motor driving unit 407, an image sensor unit 408' and a controller unit 410'. The image sensor unit 408' comprises complementary metal oxide semiconductor devices and charged couple devices (CCD) or other photoelectric devices, but is not limited to complementary metal oxide semiconductor devices or charged couple devices. The controller unit 410' comprises a backend integrated circuit chip (backend IC) for backend image signal processing.

When the auto focus device of the embodiment mentioned above is applied in an electronic appliance comprising a mobile communication apparatus or a mobile phone with an auto focus camera, if the camera function is in use, images obtained through the lens of the voice coil motor 402' and received by the image sensor unit 408' are transformed to form image signals. The image signals are transmitted to the controller unit 410'. The controller unit 410 determines the quality of the images and outputs control signals to the voice coil motor driving unit 407. The voice coil motor driving unit 407 controls the driving circuit 404a' according to the control signals. The driving circuit 404a' provides the winding coil with a forward voltage to drive the voice coil motor 402' and the winding coil with the electronic current interacts with the magnet to make the floating device moves inside the voice coil motor 402' so that the lens in the floating device can perform auto focus on the image sensor unit 408'. The image sensor unit 408' then transforms the images received to image signals and transmits the image signals to the controller unit 410' for further image signal processing. When the camera function of the mobile communication apparatus or the mobile phone is not in use, the controller unit 410' transmits control signals to the voice coil motor driving unit 407. The voice coil motor driving unit 407 controls the driving circuit 404b' according to the control signal. The driving circuit 404b' provides the winding coil with a reverse voltage to drive the voice coil motor 402' and the winding coil with the electronic current interacts with the magnet to make the floating device fixed inside the voice coil motor 402' so as to prevent the floating device from colliding with the inner surface of the voice coil motor 402' due to vibration. The floating device can be fixed against the image sensor inside the voice coil motor as shown in FIG. 2.

The invention improves the auto focus device which uses a voice coil motor to perform auto focus function so that the quality of images will not be degraded due to particles generated from the voice coil motor during a drop test or improper use if the camera function of the auto focus device is not in use. Particularly for mobile phones with auto focus camera function, when the camera function of the mobile phone is not in use, the voice coil motor is provided with a reverse voltage and a reverse electric current to fix and stabilize the floating device to prevent the floating device from vibrating to generate particles and gap and the voice coil motor can maintain stable during a drop test. Furthermore, the floating device has an outward inclined structure at one end adjacent to the image sensor in order to block and prevent particles generated from the collision between the floating device and the inner surface of the voice coil motor from falling on the surface of the image sensor to degrade the quality of the images. When the camera function of the mobile phone is in use or the mobile phone is not in use, the reverse voltage and the reverse electric current are not provided. According to the embodiments of the invention, the invention effectively improves and solves the problem resulting from particles formed during a drop test or improper use to prevent the degradation of image quality and to increase the yield ratio.

Although specific embodiments have been illustrated and described, it will be appreciated by those skilled in the art that various modifications may be made without departing from the scope of the present invention, which is intended to be limited solely by the appended claims.

What is claimed is:

1. An auto focus device of a mobile communication apparatus, comprising:
    a voice coil motor, the voice coil motor having a floating device and a tens in the floating device;
    a voice coil motor driving unit;
    a first driving circuit driving the voice coil motor by the voice coil motor driving unit to move the floating device inside the voice coil motor and to perform auto focus on at least one image sensor unit through the tens when a camera function of the mobile communication apparatus is in use; and
    a second driving circuit driving the voice coil motor by the voice coil motor driving unit to fix the floating device inside the voice coil motor, contact against and cover the image sensor unit when the camera function of the mobile communication apparatus is not in use.

2. The auto focus device of a mobile communication apparatus of claim L wherein the floating device has an outward inclined structure at one end adjacent to the image sensor unit in order to block and prevent particles generated from the collision between the floating device and the voice coil motor from falling on the surface of the image sensor unit.

3. The auto focus device of a mobile communication apparatus of claim 1, wherein the first driving circuit and the second driving circuit provide forward and reverse electronic currents respectively.

4. The auto focus device of a mobile communication apparatus of claim 1, wherein the image sensor unit comprises an image signal processor and the voice coil motor driving unit is drove by the image sensor unit.

5. The auto focus device of a mobile communication apparatus of claim 1, wherein the image sensor unit comprises a system on chip having an image signal processor.

6. The auto focus device of a mobile communication apparatus of claim 1, wherein the voice coil motor driving unit is drove by a controller unit.

7. The auto focus device of a mobile communication apparatus of claim 6, wherein the controller unit comprises a backend integrated circuit chip.

8. The auto focus device of a mobile communication apparatus of claim 1, wherein the first driving circuit terminates driving the voice coil motor when the auto focus device is not in use.

9. The auto focus device of a mobile communication apparatus of claim 1, wherein the second driving circuit drives the voice coil motor to fix the floating device inside the voice coil motor when the auto focus device is not in use.

10. A voice coil motor for an apparatus with auto focus function, comprising:
    a floating device and a winding coil winding the floating device, wherein the floating device moves inside the voice coil motor to perform auto focus on at least one image sensor unit when a forward electric current provided by a first driving circuit drove by a voice coil motor driving unit flows through the winding coil, the floating device fixes inside the voice coil motor, contacts against and cover the image sensor unit when a reverse electric current provided by a second driving circuit drove by the voice coil motor driving unit flows through the winding coil, the floating device has an outward inclined structure at one end adjacent to the image sensor unit in order to block and prevent particles generated from the collision between the floating device and the voice coil motor from falling on the surface of the image sensor unit;
    a magnet surrounding the winding coil, the magnet interacting with the winding coil with the forward or reverse electric currents to move the floating device; and
    a lens located in the floating device.

11. The voice coil motor of claim 10, wherein the apparatus with auto focus function comprises a mobile phone.

12. An auto focus device of a mobile communication apparatus, comprising:
    a voice coil motor, the voice coil motor having a floating device and a lens in the floating device;
    a voice coil motor driving unit;
    a first driving circuit driving the voice coil motor by the voice coil motor driving unit to move the floating device inside the voice coil motor and to perform auto focus on at least one image sensor unit through the lens when a camera function of the mobile communication apparatus is in use; and
    a second driving circuit driving the voice coil motor by the voice coil motor driving unit to fix the floating device inside the voice coil motor, contact against and cover the image sensor unit when the camera function of the mobile communication apparatus is not in use, wherein the first driving circuit and the second driving circuit provide forward and reverse electronic currents respectively.

13. The auto focus device of a mobile communication apparatus of claim 12, wherein the first driving circuit terminates driving the voice coil motor when the auto focus device is not in use.

14. The auto focus device of a mobile communication apparatus of claim 12, wherein the second driving circuit drives the voice coil motor to fix the floating device inside the voice coil motor when the auto focus device is not in use.

15. The auto focus device of a mobile communication apparatus of claim 12, wherein the floating device has an outward inclined structure at one end adjacent to the image sensor unit in order to block and prevent particles generated from the collision between the floating device and the voice coil motor from fatting on the surface of the image sensor unit.

16. The auto focus device of a mobile communication apparatus of claim 12 wherein the image sensor unit comprises an image signal processor and the voice coil motor driving unit is drove by the image sensor unit.

17. The auto focus device of a mobile communication apparatus of claim 12, wherein the image sensor unit comprises a system on chip having an image signal processor.

18. The auto focus device of a mobile communication apparatus of claim 12, wherein the voice coil motor driving unit is drove by a controller unit.

19. The auto focus device of a mobile communication apparatus of claim 18, wherein the controller unit comprises a backend integrated circuit chip.

* * * * *